United States Patent
Wang et al.

(10) Patent No.: US 9,633,444 B2
(45) Date of Patent: Apr. 25, 2017

(54) METHOD AND DEVICE FOR IMAGE SEGMENTATION

(71) Applicant: Xiaomi Inc., Beijing (CN)

(72) Inventors: Lin Wang, Beijing (CN); Qiuping Qin, Beijing (CN); Zhijun Chen, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 137 days.

(21) Appl. No.: 14/583,816

(22) Filed: Dec. 29, 2014

(65) Prior Publication Data

US 2015/0317800 A1 Nov. 5, 2015

Related U.S. Application Data

(63) Continuation of application No. PCT/CN2014/089297, filed on Oct. 23, 2014.

(30) Foreign Application Priority Data

May 5, 2014 (CN) .......................... 2014 1 0187226

(51) Int. Cl.
*G06K 9/34* (2006.01)
*G06T 7/00* (2017.01)
*G06T 7/40* (2017.01)

(52) U.S. Cl.
CPC .......... *G06T 7/0081* (2013.01); *G06T 7/0083* (2013.01); *G06T 7/0093* (2013.01);
(Continued)

(58) Field of Classification Search
CPC ... G06T 7/0081; G06T 7/0083; G06T 7/0093; G06T 7/408; G06T 2207/20072; G06T 2207/20144
(Continued)

(56) References Cited

U.S. PATENT DOCUMENTS 7,444,019 B2 * 10/2008 Boykov ................ G06T 7/0083
382/164
7,899,248 B2 3/2011 Liu
(Continued)

FOREIGN PATENT DOCUMENTS

CN 101689305 A 3/2010
CN 102332097 A 1/2012
(Continued)

OTHER PUBLICATIONS

Yuri Boykov,"An Experimental Comparison of Min-Cut/Max-Flow Algorithms for Energy Minimization in Vision", pp. 1124-1137 IEEE Transactions on Pattern Analysis and Machine Intelligence, vol. 26, No. 9, Sep. 2004.*
(Continued)

*Primary Examiner* — Mekonen Bekele
(74) *Attorney, Agent, or Firm* — Jun He Law Offices P.C.; James J. Zhu

(57) ABSTRACT

The present disclosure provides an image segmentation method and device. The image segmentation method comprises: establishing a saliency model of an image; obtaining foreground sample points and background sample points of the image according to the saliency model; establishing a foreground and background classification model according to the saliency model, the foreground sample points and the background sample points; and segmenting the image according to a predefined graph cut algorithm which segments the image by using the foreground and background classification model and edge information related to pixels in the image. A problem that a user needs to manually and roughly select the foreground sample points and the background sample points and thus the segmentation efficiency is low for segmenting a large number of images is solved.

16 Claims, 7 Drawing Sheets

(52) U.S. Cl.
CPC .... *G06T 7/408* (2013.01); *G06T 2207/20072* (2013.01); *G06T 2207/20144* (2013.01)

(58) Field of Classification Search
USPC .......................... 382/173, 159, 224, 253, 274
See application file for complete search history.

(56) References Cited

U.S. PATENT DOCUMENTS

| | | | |
|---|---|---|---|
| 8,009,911 B2 | 8/2011 | Singaraju et al. | |
| 8,050,498 B2 * | 11/2011 | Wilensky | G06T 7/0083 345/642 |
| 8,175,384 B1 * | 5/2012 | Wang | G06T 7/0081 348/586 |
| 8,533,139 B2 * | 9/2013 | Jamriška | G06N 5/02 706/45 |
| 8,938,122 B2 * | 1/2015 | Kanda | G06T 7/0083 358/296 |
| 2002/0048401 A1 * | 4/2002 | Boykov | G06K 9/342 382/173 |
| 2004/0008886 A1 * | 1/2004 | Boykov | G06K 9/342 382/173 |
| 2005/0213837 A1 * | 9/2005 | Boykov | G06T 7/0083 382/253 |
| 2006/0170695 A1 * | 8/2006 | Zhou | G06T 15/04 345/582 |
| 2007/0081710 A1 * | 4/2007 | Hong | G06K 9/38 382/128 |
| 2009/0060330 A1 | 3/2009 | Liu | |
| 2009/0310883 A1 * | 12/2009 | Moriya | G06T 7/0012 382/274 |
| 2010/0046837 A1 * | 2/2010 | Boughorbel | G06T 7/0051 382/173 |
| 2010/0329550 A1 * | 12/2010 | Cheatle | G06T 11/60 382/165 |
| 2011/0286673 A1 * | 11/2011 | Givon | G06T 7/0081 382/199 |
| 2012/0093402 A1 * | 4/2012 | Staelin | G06K 9/4671 382/165 |
| 2016/0037087 A1 * | 2/2016 | Price | H04N 5/2226 348/586 |

FOREIGN PATENT DOCUMENTS

| | | | | |
|---|---|---|---|---|
| CN | 102982545 A | 3/2013 | | |
| CN | 103198489 A | 7/2013 | | |
| CN | 103208123 A | 7/2013 | | |
| CN | WO 2014169822 A1 * | 10/2014 | ........... | G06T 7/0081 |
| EP | 1081648 B1 | 5/2005 | | |
| JP | 2008042346 A | 2/2008 | | |
| JP | 2008524728 A | 7/2008 | | |
| JP | 2010258914 A | 11/2010 | | |
| JP | 2011150605 A | 8/2011 | | |
| RU | 2121714 C1 | 11/1998 | | |
| RU | 2011134204 A | 2/2013 | | |

OTHER PUBLICATIONS

Chieh-Chi Kao, "Automatic Object Segmentation With Salient Color Model", 6 pages, pub. 2011 IEEE.*
Zhaohui Wang et al., "Automatic Object Extraction in Nature Scene Based on Visual Saliency and Super Pixels", pp. 547-554, 2012. Springer-Verlag Berlin Heidelberg 2012.*
"International Search Report for PCT/CN2014/089297".
Chieh-Chi Kao et al. "Automatic Object Segmentation With Salient Color Model" 2011 IEEE International Conference on Multimedia and Expo, Jul. 11, 2011, pp. 1-6, XP031964589.
Zhaohui Wang et al. "Automatic object Extraction in Nature Scene Based on Visual Saliency and Super Pixels", AICI 2012, LNAI 7530, pp. 547-554, Oct. 26, 2012, XP047019437.
The extended European search report for 15163752.7.
Daiki Gion et al."Interactive Segmentation for Color Image Based on Color Saliency" IEEJ Transactions on Electronics, Information and Systems vol. 133 No. 6, pp. 1211-1217; Jun. 1, 2013, ISSN 0385-4221.

* cited by examiner

METHOD AND DEVICE FOR IMAGE SEGMENTATION

CROSS-REFERENCE TO RELATED APPLICATIONS

This application is a Continuation application of International Application No. PCT/CN2014/089297, filed on Oct. 23, 2014, which is based upon and claims priority to Chinese Patent Application No. 201410187226.7, filed on May 5, 2014, the entire contents of which are incorporated herein by reference.

TECHNICAL FIELD

The present application generally relates to image processing technology, and more particularly, to an image segmentation method and device.

BACKGROUND

As a basis of image analysis, image editing, image synthesis and the like, image segmentation technology may segment foreground and background from an image. It is an important research subject at present how to quickly and automatically segment the foreground and the background from an image.

In related image segmentation methods, at first, foreground sample points and background sample points of an image manually selected by a user are received. Then a foreground and background color likelihood model is established according to the foreground sample points manually selected by the user. At last, the image is segmented according to the foreground and background color likelihood model, thus obtaining the foreground and the background after segmentation.

SUMMARY

According to a first aspect of the present application, there is provided an image segmentation method, comprising: establishing a saliency model of an image; obtaining foreground sample points and background sample points of the image according to the saliency model; establishing a foreground and background classification model according to the saliency model, the foreground sample points and the background sample points; and segmenting the image according to a predefined graph cut algorithm by using the foreground and background classification model and edge information related to pixels in the image.

According to a second aspect of the present application, there is provided an image segmentation device, comprising: a processor; a memory configured to store instructions executable by the processor; wherein, the processor is configured to perform: establishing a saliency model of an image; obtaining foreground sample points and background sample points of the image according to the saliency model; establishing a foreground and background classification model according to the saliency model, the foreground sample points and the background sample points; and segmenting the image according to a predefined graph cut algorithm which segments the image by using the foreground and background classification model and edge information related to pixels in the image.

According to a third aspect of the present application, there is provided a non-transitory computer-readable storage medium. The medium may have stored therein instructions, when executed by one or more processors of a mobile device, causes the mobile device to perform an image segmentation method, comprising: establishing a saliency model of an image; obtaining foreground sample points and background sample points of the image according to the saliency model; establishing a foreground and background classification model according to the saliency model, the foreground sample points and the background sample points; and segmenting the image according to a predefined graph cut algorithm which segments the image by using the foreground and background classification model and edge information related to pixels in the image.

It will be appreciated that both the foregoing general description and the following detailed description are exemplary and explanatory only and are not restrictive of the application.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The electronic device described herein may be a smart mobile phone, a tablet computer, a smart television, an ebook reader, an MP3 (Moving Picture Experts Group Audio Layer III) player, an MP4 (Moving Picture Experts Group Audio Layer IV) player, a laptop computer, a desktop computer or the like.

Figure 1:
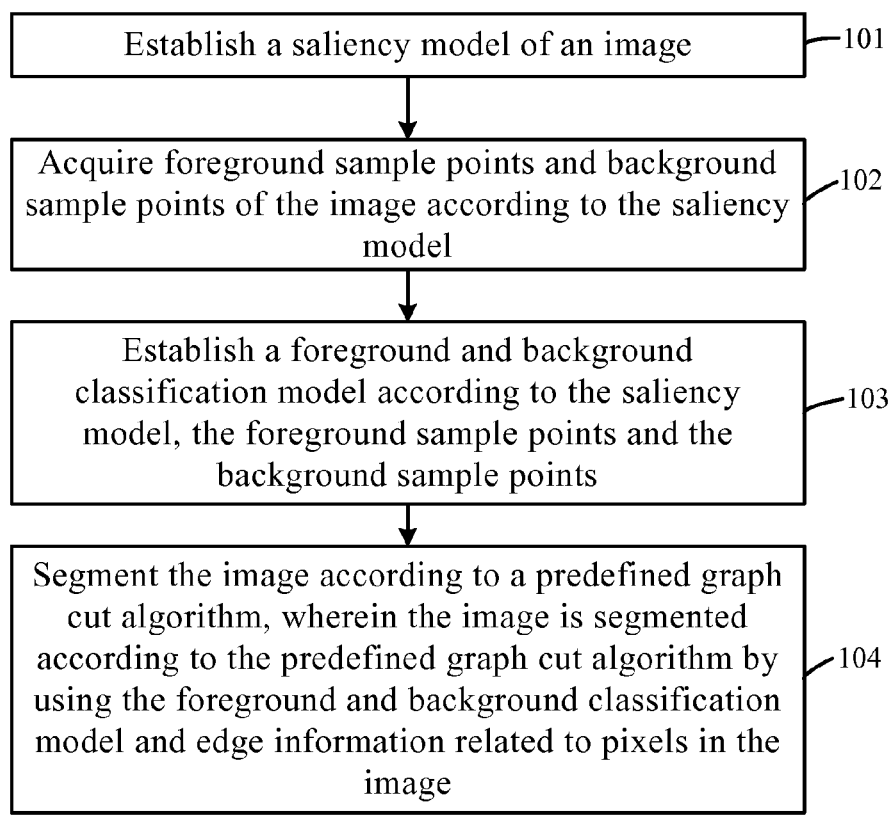
FIG. 1 is a flow chart showing an image segmentation method according to an exemplary embodiment.

FIG. 1 is a flow chart showing an image segmentation method according to an exemplary embodiment. As shown in FIG. 1, the image segmentation method is used in an electronic device. The method includes the following steps:

In Step 101, a saliency model of an image is established.

In Step 102, foreground sample points and background sample points of the image are obtained according to the saliency model.

In Step 103, a foreground and background classification model is established according to the saliency model, the foreground sample points and the background sample points.

In Step 104, the image is segmented according to a predefined graph cut algorithm, and specifically the image is segmented according to the predefined graph cut algorithm by using the foreground and background classification model and edge information related to pixels in the image.

For the image segmentation method according to the embodiments of the present application, a foreground and background classification model is established by automatically determining the foreground sample points and the background sample point as well as combining the saliency model with the foreground sample points and the background sample points, and image segmentation is achieved by using the foreground and background classification model. A problem in the related technologies that a user needs to manually and roughly select the foreground sample points and the background sample points and thus the segmentation efficiency for segmenting a large number of images is low can be solved. Automatic selection of samples is realized and the accuracy of classification is improved because it is available for automatic acquisition of the foreground sample points and the background sample points and a transcendental saliency model is combined when establishing the foreground and background classification model.

Figure 2A:
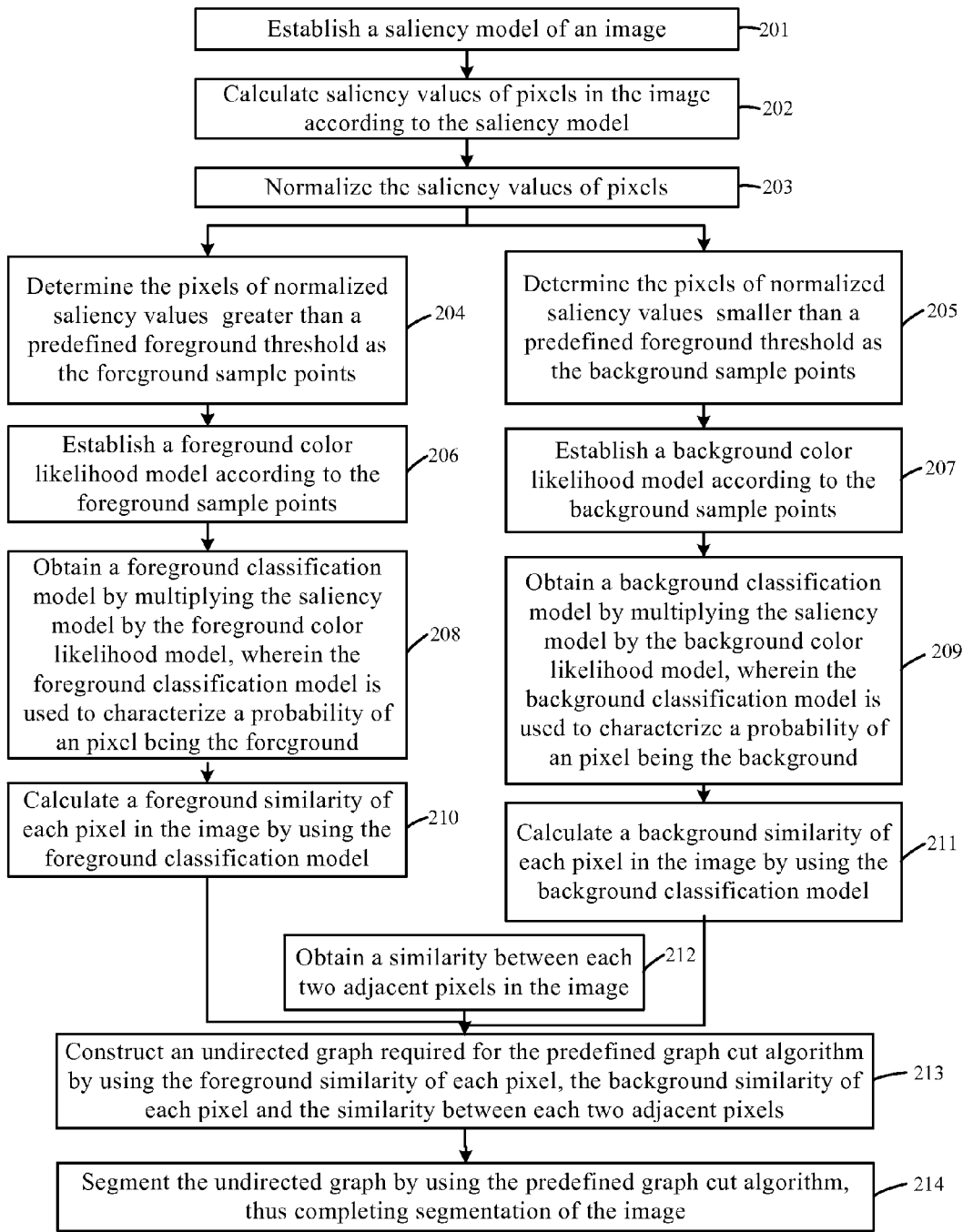
FIG. 2A is a flow chart showing an image segmentation method according to another exemplary embodiment.

FIG. 2A is a flow chart showing an image segmentation method according to another exemplary embodiment. As shown in FIG. 2A, the image segmentation method is applied to an electronic device. The method includes the following steps:

In Step 201, a saliency model of an image is established.

In certain examples, the saliency model of the image may be established in a variety of ways, which will be further described below.

Figure 2B:
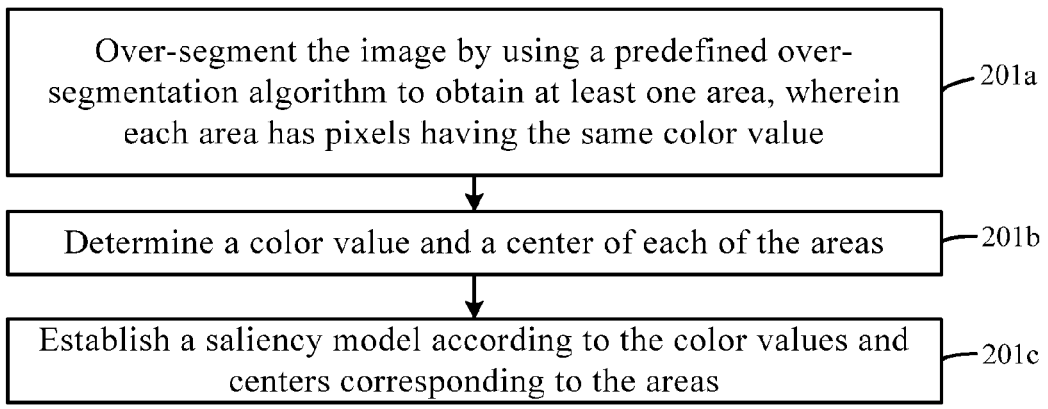
FIG. 2B is a flow chart showing how to establish a saliency model of an image according to an exemplary embodiment.

The first way will be described by referring to FIG. 2B. FIG. 2B is a flow chart showing how to establish the saliency model of the image according to an exemplary embodiment. The method includes:

In substep 201a, the image is over-segmented by using a predefined over-segmentation algorithm to obtain at least one area. Each area has pixels having the same color value.

Over-segmenting an image means segmenting the image into different areas and pixels in each of the segmented areas have the same or similar feature. For example, pixels in a certain area after over-segmentation have the same or approximate color value.

The over-segmentation algorithm used herein is a mean shift-based over-segmentation algorithm. In certain examples, other over-segmentation algorithms may be used, e.g. a watershed-based over-segmentation algorithm and an ultra-pixel clustering-based over-segmentation algorithm, etc. The embodiment does not pose any limitation on the over-segmentation algorithm.

In substep 201b, a color value and a center of each area are determined.

As the pixels in an area after over-segmentation have the same color value, the color value of the area can be determined, and the center of the area can also be calculated.

In substep 201c, the saliency model is established according to the color values and centers corresponding to the areas.

The saliency model established according to substeps 201a-201c may be:

$$S_{i1} = \sum_{j=1, j \neq i}^{N} w(R_j) D_S(R_i, R_j) D_C(R_i, R_j),$$

wherein $S_{i1}$ is the saliency value of a pixel in an area $R_i$, $w(R_j)$ is the number of pixels in an area $R_j$, $D_S(R_i,R_j)$ represents a metric value of difference in spatial position between the area $R_i$ and the area $R_j$, $D_C(R_i,R_j)$ represents a metric value of difference in color between the area $R_i$ and the area $R_j$, N is the total number of the areas after over-segmentation of the image, $$D_S(R_i,R_j)=\exp(-(\text{Center}(R_i)-\text{Center}(R_j))^2/\sigma_s^2),$$

Center($R_i$) is the center of the area $R_i$, Center($R_j$) is the center of the area $R_j$, and when all coordinates of pixels in the image are normalized within a range [0, 1], $\sigma_s^2=0.4$.

$D_C(R_i,R_j)$ may be characterized by Euclidean distance between an average color value of the area $R_i$ and an average color value of the area $R_j$. The average color value of an area is obtained by dividing the sum of color values of pixels in the area by the total number of pixels in the area. In ideal conditions, the color values of different pixels in an area are the same, then the color value of the area is the color value of any pixel in the area. However, in practical situations, the color values of different pixels in the same area may not exactly the same. Usually, the color values of different pixels may be approximate. Then the average color value of the area is obtained by dividing the sum of color values of pixels in the area by the total number of pixels in the area.

As can be seen from the saliency model that the saliency model may be used to characterize the influence on the saliency values of pixels in each area caused by other areas in the image.

Figure 2C:
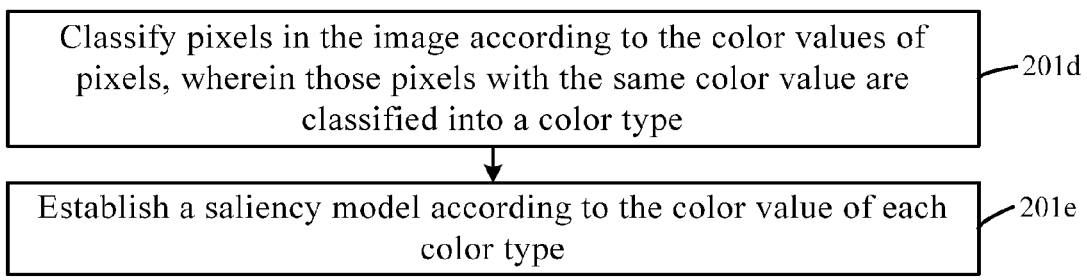
FIG. 2C is a flow chart showing how to establish a saliency model of an image according to another exemplary embodiment.

The second way will be described by referring to FIG. 2C. FIG. 2C is a flow chart showing how to establish the saliency model of the image according to another exemplary embodiment. The second way includes the following steps:

In substep 201d, the pixels in the image are classified according to the color values of pixels, wherein those pixels with the same color value are classified into a color type.

In certain examples, a storage space (for example, a storage queue or a storage stack and the like) corresponding to a color value and configured to store pixels may be provided. The size of the storage space may be 256*256*256. The pixels in the image are read out successively, and stored in the respective storage spaces corresponding to the color values of pixels. In this way, the color values of pixels stored in each storage space are the same.

After reading out the pixels in the image, the pixels stored in each storage space are counted to obtain their number.

In substep 201e, the saliency model is established according to the color value of each color type.

The saliency model established according to the color value of each color type is:

$$S_{i2} = \sum_{j=1, j \neq i}^{N} w(P_j) D_C(P_i, P_j),$$

wherein w($P_j$) is the number of pixels in a color type $R_j$, $D_C(P_i, P_j)$ represents a metric value of difference in color between the color type $P_i$ and the color type $P_j$.

It should be noted that in practical applications, after the pixels in the image are classified according to substep 201*d*, the number of pixels corresponding to certain color types may be few, and thus the color of these pixels has little impact on the saliency values of the color of other pixels. Therefore, in a preferred example, in order to reduce the calculation, the color types corresponding to more pixels may be selected for establishing the saliency model.

In Step 202, the saliency values of pixels in the image are calculated according to the saliency model.

In Step 203, the saliency values of pixels are normalized.

Usually, the saliency values of pixels are normalized within a range (0, 1).

In Step 204, the pixels of normalized saliency values greater than a predefined foreground threshold are determined as the foreground sample points.

The predefined foreground threshold may be defined according to practical application when the saliency values of pixels are normalized within a range of (0, 1). For example, the predefined foreground threshold may be set as 0.8.

In Step 205, the pixels of normalized saliency values smaller than a predefined background threshold are determined as the background sample points.

The predefined foreground threshold may be defined according to practical situation when the saliency values of pixels are normalized within a range of (0, 1). For example, the predefined foreground threshold may be set as 0.25.

In certain embodiments, the predefined foreground threshold is greater than the predefined background threshold.

Accordingly, the foreground sample points and the background sample points may be automatically determined according to the saliency model established.

In Step 206, a foreground color likelihood model is established according to the foreground sample points.

In practical application, there are several ways to establish the color likelihood model. For example, the color likelihood model may be established by the histogram statistic-based mathematical modeling or by the Gaussian mixture model. If the sample points for establishing the color likelihood model are the foreground sample points, a foreground color likelihood model is established accordingly.

In Step 207, a background color likelihood model is established according to the background sample points.

Similarly, the color likelihood model may be established by the histogram statistic-based mathematical modeling or by the Gaussian mixture model. If the sample points for establishing the color likelihood model are the background sample points, a background color likelihood model is established accordingly.

In Step 208, a foreground classification model is obtained by multiplying the saliency model by the foreground color likelihood model. The foreground classification model is used to characterize a probability of a pixel being the foreground.

In order to improve the accuracy of segmenting the foreground of the image, the foreground classification model may be obtained by combining a transcendental saliency model with an improved foreground color likelihood model. For example, the foreground classification model may be obtained by multiplying the saliency model by the foreground color likelihood model.

In Step 209, a background classification model is obtained by multiplying the saliency model by the background color likelihood model. The background classification model is used to characterize a probability of a pixel being the background.

Similarly, in order to improve the accuracy of segmenting the background of the image, the background classification model may be obtained by combining a transcendental saliency model with an improved background color likelihood model. For example, the background classification model may be obtained by multiplying the saliency model by the background color likelihood model.

In Step 210, a foreground similarity of each pixel in the image is calculated by using the foreground classification model.

As the foreground classification model is used to characterize the probability of a pixel being the foreground (i.e., the similarity between the pixel and the foreground), the foreground classification model may be directly used to calculate the foreground similarity of each pixel in the image.

In Step 211, a background similarity of each pixel in the image is calculated by using the background classification model.

Similarly, as the background classification model is used to characterize the probability of a pixel being the background (i.e., the similarity between the pixel and the background), the background classification model may be directly used to calculate the background similarity of each pixel in the image.

In Step 212, a similarity between each two adjacent pixels in the image is obtained.

In Step 213, an undirected graph required for the predefined graph cut algorithm is constructed by using the foreground similarity of each pixel, the background similarity of each pixel and the similarity between each two adjacent pixels.

Figure 2D:
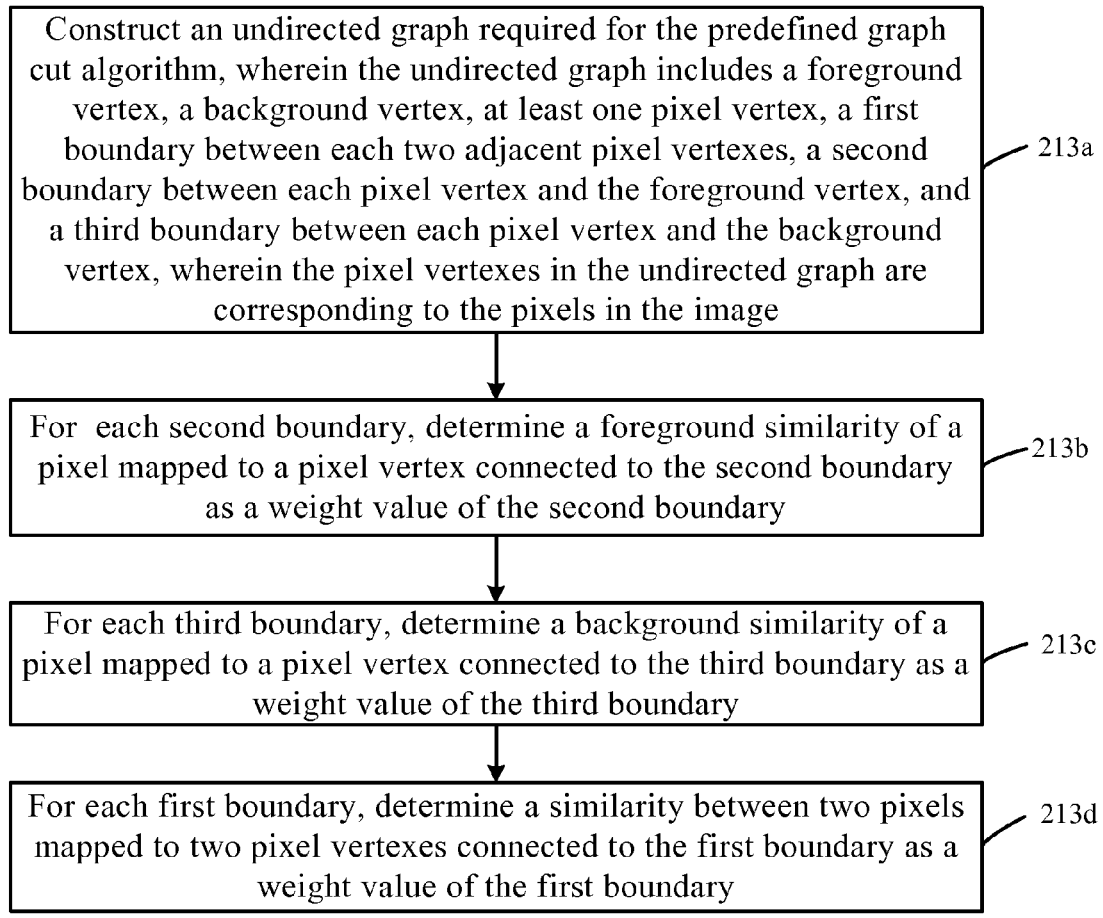
FIG. 2D is a flow chart showing how to construct an undirected graph according to an exemplary embodiment.

Referring to FIG. 2D, a flow chart for constructing the undirected graph according to an exemplary embodiment is shown. The undirected graph required for the predefined graph cut algorithm is constructed by using the foreground similarity of each pixel, the background similarity of each pixel and the similarity between each two adjacent pixels. The constructing method includes the following steps:

In substep 213*a*, the undirected graph required for the predefined graph cut algorithm is constructed. The undirected graph includes a foreground vertex, a background vertex, at least one pixel vertex, a first boundary between each two adjacent pixel vertexes, a second boundary between each pixel vertex and the foreground vertex, and a third boundary between each pixel vertex and the background vertex, wherein the pixel vertexes in the undirected graph are corresponding to the pixels in the image.

The pixel vertexes in the undirected graph are obtained by mapping the pixels in the image to the undirected graph. In other words, the number of pixels in the image is equal to that of pixel vertexes in the undirected graph as constructed, and each pixel is corresponding to a pixel vertex or vice versa.

Figure 2E:
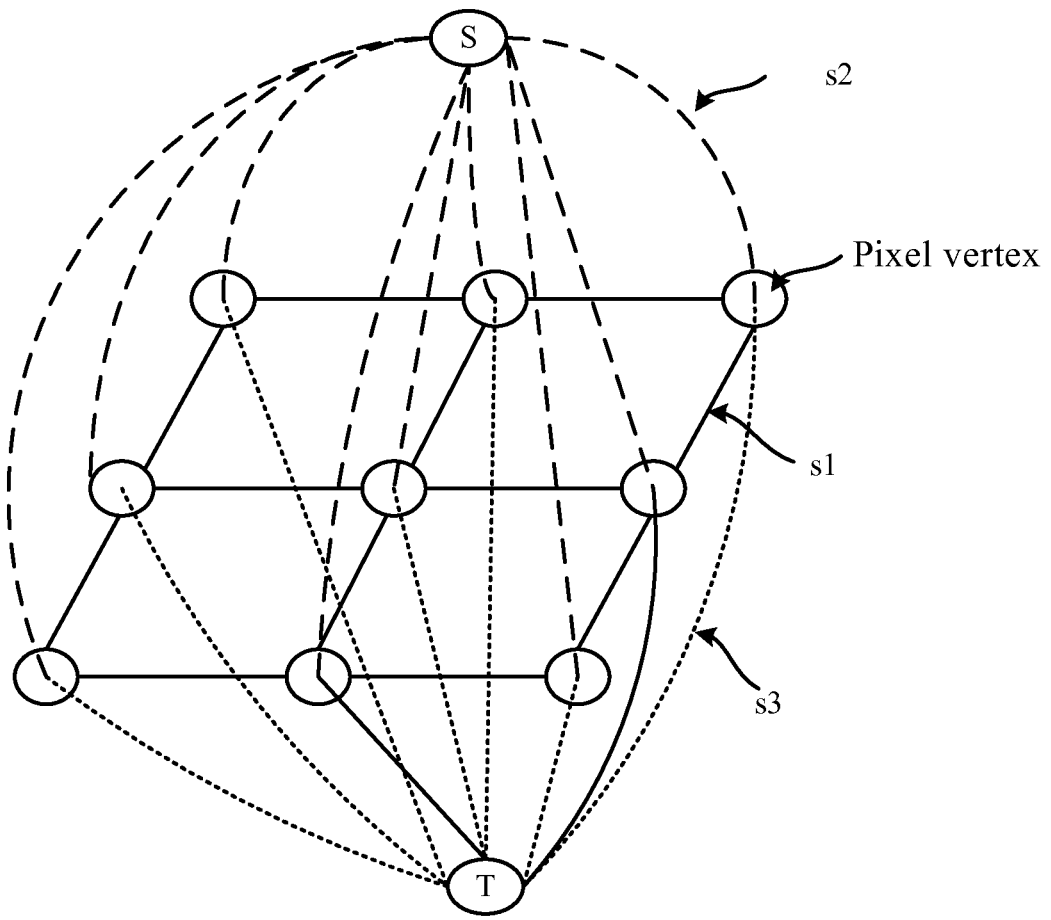
FIG. 2E is a schematic diagram showing an undirected graph according to an exemplary embodiment.

Referring to FIG. 2E, a schematic diagram of an undirected graph according to an exemplary embodiment is shown. The undirected graph includes pixel vertexes corresponding to the pixels in the image. For simplicity, only nine pixel vertexes are shown in FIG. 2E. The undirected graph also includes a foreground vertex S and a background vertex T. A first boundary s1 is formed by connecting two adjacent pixel vertexes. A second boundary s2 is formed by connecting the foreground vertex S with any pixel vertex. A third boundary s3 is formed by connecting the background vertex T with any pixel vertex.

In substep 213b, for each second boundary, a foreground similarity of a pixel corresponding to a pixel vertex connected to the second boundary is determined as a weight value of the second boundary.

For example, for a selected pixel vertex, a pixel corresponding to the selected pixel vertex may be determined, and the foreground similarity of the pixel is regarded as the weight value of the second boundary between the selected pixel vertex and the foreground vertex.

In substep 213c, for each third boundary, a background similarity of a pixel corresponding to a pixel vertex connected to the third boundary is determined as a weight value of the third boundary.

For example, for a selected pixel vertex, a pixel corresponding to the selected pixel vertex may be determined, and the background similarity of the pixel is regarded as the weight value of the third boundary between the selected pixel vertex and the background vertex.

In substep 213d, for each first boundary, a similarity between two pixels corresponding to two pixel vertexes connected to the first boundary is determined as a weight value of the first boundary.

In Step 214, the undirected graph is segmented by using the predefined graph cut algorithm, thus completing segmentation of the image.

The predefined graph cut algorithm may be any suitable graph cut algorithm, which is used to segment the image by using the foregoing undirected graph constructed by Step 213. It would be appreciated by those skilled in the art to segment an undirected graph by using a graph cut algorithm.

In conclusion, with the image segmentation method according to the embodiments of the present application, a foreground and background classification model is established by automatically determining the foreground sample points and the background sample point as well as combining the saliency model with the foreground sample points and the background sample points, and image segmentation is achieved by using the foreground and background classification model. A problem in the related technologies that a user needs to manually and roughly select the foreground sample points and the background sample points and thus the segmentation efficiency for segmenting a large number of images is low can be solved. Automatic selection of samples is realized and the accuracy of classification is improved because it is available for automatic acquisition of the foreground sample points and the background sample points and a transcendental saliency model is combined when establishing the foreground and background classification mode.

The following is device embodiments of the present application, which may be used to implement the method embodiments of the present application. Please refer to the method embodiments of the present application with regard to relevant details about the device embodiments of the present application.

Figure 3:
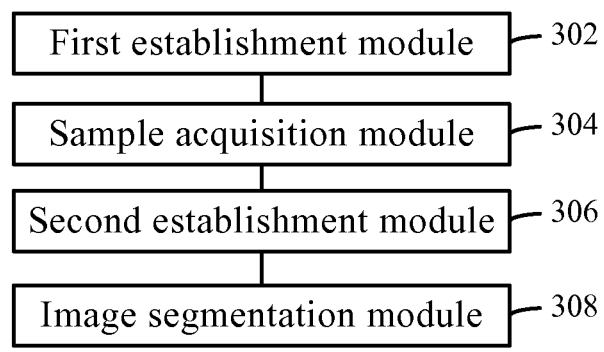
FIG. 3 is a block diagram of an image segmentation apparatus according to an exemplary embodiment.

FIG. 3 is a block diagram showing an image segmentation apparatus according to an exemplary embodiment. As shown in FIG. 3, the image segmentation apparatus is used in an electronic device. The image segmentation apparatus includes a first establishment module 302, a sample acquisition module 304, a second establishment module 306 and an image segmentation module 308.

The first establishment module 302 is configured to establish a saliency model of an image.

The sample acquisition module 304 is configured to obtain foreground sample points and background sample points of the image according to the saliency model.

The second establishment module 306 is configured to establish a foreground and background classification model according to the saliency model established by the first establishment module, the foreground sample points and the background sample points obtained by the sample acquisition module.

The image segmentation module 308 is configured to segment the image according to a predefined graph cut algorithm. Specifically, the image is segmented according to the predefined graph cut algorithm by using the foreground and background classification model established by the second establishment module and edge information related to pixels in the image.

For the image segmentation apparatus according to the embodiments of the present application, a foreground and background classification model is established by automatically determining the foreground sample points and the background sample point as well as combining the saliency model with the foreground sample points and the background sample points, and image segmentation is achieved by using the foreground and background classification model. A problem in the related technologies that a user needs to manually and roughly select the foreground sample points and the background sample points and thus the segmentation efficiency for segmenting a large number of images is low can be solved. Automatic selection of samples is realized and the accuracy of classification is improved because it is available for automatic acquisition of the foreground sample points and the background sample points and a transcendental saliency model is combined when establishing the foreground and background classification mode.

Figure 4:
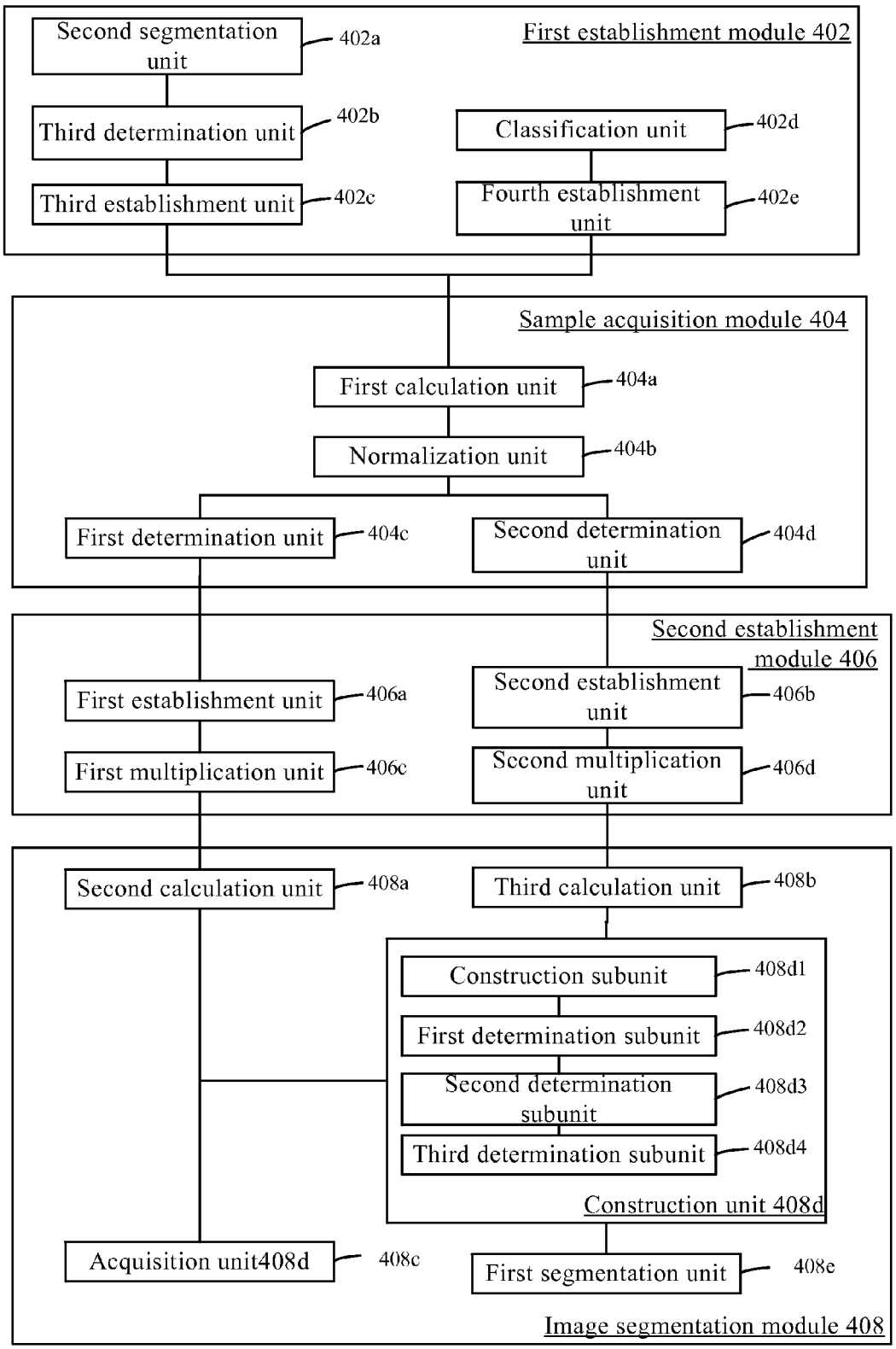
FIG. 4 is a block diagram of an image segmentation apparatus according to another exemplary embodiment.

FIG. 4 is a block diagram showing an image segmentation apparatus according to another exemplary embodiment. As shown in FIG. 4, the image segmentation apparatus is used in an electronic device. The image segmentation apparatus includes a first establishment module 402, a sample acquisition module 404, a second establishment module 406 and an image segmentation module 408.

The first establishment module 402 is configured to establish a saliency model of an image.

The sample acquisition module 404 is configured to obtain foreground sample points and background sample points of the image according to the saliency model.

The second establishment module 406 is configured to establish a foreground and background classification model according to the saliency model established by the first establishment module 402, the foreground sample points and the background sample points obtained by the sample acquisition module 404.

The image segmentation module 408 is configured to segment an image according to a predefined graph cut algorithm. Specifically the image is segmented according to the predefined graph cut algorithm by using the foreground and background classification model established by the second establishment module 406 and edge information related to pixels in the image.

In a first implementation of an embodiment as shown in FIG. 4, the sample acquisition module 404 may include a first calculation unit 404a, a normalization unit 404b, a first determination unit 404c and a second determination unit 404d.

The first calculation unit 404a is configured to calculate saliency values of pixels in the image according to the saliency model.

The normalization unit 404b is configured to normalize the saliency values of pixels calculated by the first calculation unit 404a.

The first determination unit 404c is configured to determine pixels with normalized saliency values greater than the predefined foreground threshold as the foreground sample point.

The second determination unit 404d is configured to determine pixels with normalized saliency values smaller than the predefined background threshold as the background sample point.

The predefined foreground threshold is greater than the predefined background threshold, and the normalized saliency values are in a range (0, 1).

In a second implementation of an embodiment as shown in FIG. 4, the foreground and background classification model includes a foreground classification model and a background classification model, and the second establishment module 406 may include a first establishment unit 406a, a second establishment unit 406b, a first multiplication unit 406c and a second multiplication unit 406d.

The first establishment unit 406a is configured to establish a foreground color likelihood model according to the foreground sample points.

The second establishment unit 406b is configured to establish a background color likelihood model according to the background sample points.

The first multiplication unit 406c is configured to multiply the saliency model established by the first establishment module 402 by the foreground color likelihood model established by the first establishment unit 406a, thus obtaining the foreground classification model which is used to characterize a probability of a pixel being the foreground.

The second multiplication unit 406d is configured to multiply the saliency model established by the first establishment module 402 by the background color likelihood model established by the second establishment unit 406b, thus obtaining the background classification model which is used to characterize a probability of a pixel being the background.

In a third implementation of an embodiment as shown in FIG. 4, the image segmentation module 408 may include a second calculation unit 408a, a third calculation unit 408b, an acquisition unit 408c, a construction unit 408d and a first segmentation unit 408e.

The second calculation unit 408a is configured to calculate a foreground similarity of each pixel in the image by using the foreground classification model.

The third calculation unit 408b is configured to calculate a background similarity of each pixel in the image by using the background classification model.

The acquisition unit 408c is configured to obtain a similarity between two adjacent pixels in the image.

The construction unit 408d is configured to construct an undirected graph required for the predefined graph cut algorithm by using the foreground similarity of each pixel, the background similarity of each pixel and the similarity between each two adjacent pixels.

The first segmentation unit 408e is configured to segment the undirected graph by using the predefined graph cut algorithm, thus completing the segmentation of the image.

In a fourth implementation of an embodiment as shown in FIG. 4, the construction unit 408d may include a construction subunit 408d1, a first determination subunit 408d2, a second determination subunit 408d3 and a third determination subunit 408d4.

The construction subunit 408d1 is configured to construct an undirected graph required for the predefined graph cut algorithm. The undirected graph includes a foreground vertex, a background vertex, at least one pixel vertex, a first boundary between each two adjacent pixel vertexes, a second boundary between each pixel vertex and the foreground vertex, and a third boundary between each pixel vertex and the background vertex, wherein the pixel vertexes in the undirected graph are corresponding to the pixels in the image.

The first determination subunit 408d2 is configured to, for each second boundary, determine the foreground similarity of a pixel corresponding to a pixel vertex connected to the second boundary as a weight value of the second boundary.

The second determination subunit 408d3 is configured to, for each third boundary, determine the background similarity of a pixel corresponding to a pixel vertex connected to the third boundary as the weight value of the third boundary.

The third determination subunit 408d4 is configured to, for each first boundary, determine the similarity between two pixels corresponding to two pixel vertexes connected to the first boundary as the weight value of the first boundary.

In a fifth implementation of an embodiment as shown in FIG. 4, the first establishment module 402 may include a second segmentation unit 402a, a fourth determination unit 402b and a third establishment unit 402c.

The second segmentation unit 402a is configured to conduct over-segmentation of the image by using a predefined over-segmentation algorithm, thus obtaining at least one area having pixels of the same color value.

The fourth determination unit 402b is configured to determine a color value and a center of each area.

The third establishment unit 402c is configured to establish the saliency model according to the color values and centers corresponding to the areas.

In a sixth implementation of an embodiment as shown in FIG. 4, the saliency model is:

$$S_{i1} = \sum_{j=1, j \neq i}^{N} w(R_j) D_S(R_i, R_j) D_C(R_i, R_j),$$

wherein $S_{i1}$ is the saliency value of a pixel in an area $R_i$, $w(R_j)$ is the number of pixels in an area $R_j$, $D_s(R_i, R_j)$ represents a metric value of difference in spatial position between the area $R_i$ and the area $R_j$, $D_C(R_i, R_j)$ represents a metric value of difference in color between the area $R_i$ and the area $R_j$, N is the total number of the areas after over-segmentation of the image, $$D_S(R_i, R_j) = \exp(-(\text{Center}(R_i) - \text{Center}(R_j))^2 / \sigma_s^2),$$

Center($R_i$) is the center of the area $R_i$, Center($R_j$) is the center of the area $R_j$, and when all coordinates of pixels in the image are normalized within a range [0, 1], $\sigma_s^2 = 0.4$.

In a seventh implementation of an embodiment as shown in FIG. 4, the first establishment module 402 may include a classification unit 402d and a fourth establishment unit 402e.

The classification unit 402d is configured to classify the pixels in the image according to the color values of pixels, and those pixels with the same color value are classified into a color type.

The fourth establishment unit 402e is configured to establish the saliency model according to the color value of each color type.

In an eighth implementation of an embodiment as shown in FIG. 4, the saliency model is:

$$S_{i2} = \sum_{j=1, j\neq i}^{N} w(P_j) D_C(P_i, P_j),$$

wherein $w(P_j)$ is the number of pixels in a color type $R_j$, $D_C(P_i,P_j)$ represents a metric value of difference in color between the color type $P_i$ and the color type $P_j$.

For the image segmentation apparatus according to the embodiments of the present application, a foreground and background classification model is established by automatically determining the foreground sample points and the background sample point as well as combining the saliency model with the foreground sample points and the background sample points, and image segmentation is achieved by using the foreground and background classification model. A problem in the related technologies that a user needs to manually and roughly select the foreground sample points and the background sample points and thus the segmentation efficiency for segmenting a large number of images is low can be solved. Automatic selection of samples is realized and the accuracy of classification is improved because it is available for automatic acquisition of the foreground sample points and the background sample points and a transcendental saliency model is combined when establishing the foreground and background classification mode.

With regard to the apparatus of the above embodiments, the details of specific modes for executing operation of the modules has been described in the method embodiments, which will not be elaborated herein.

Figure 5:
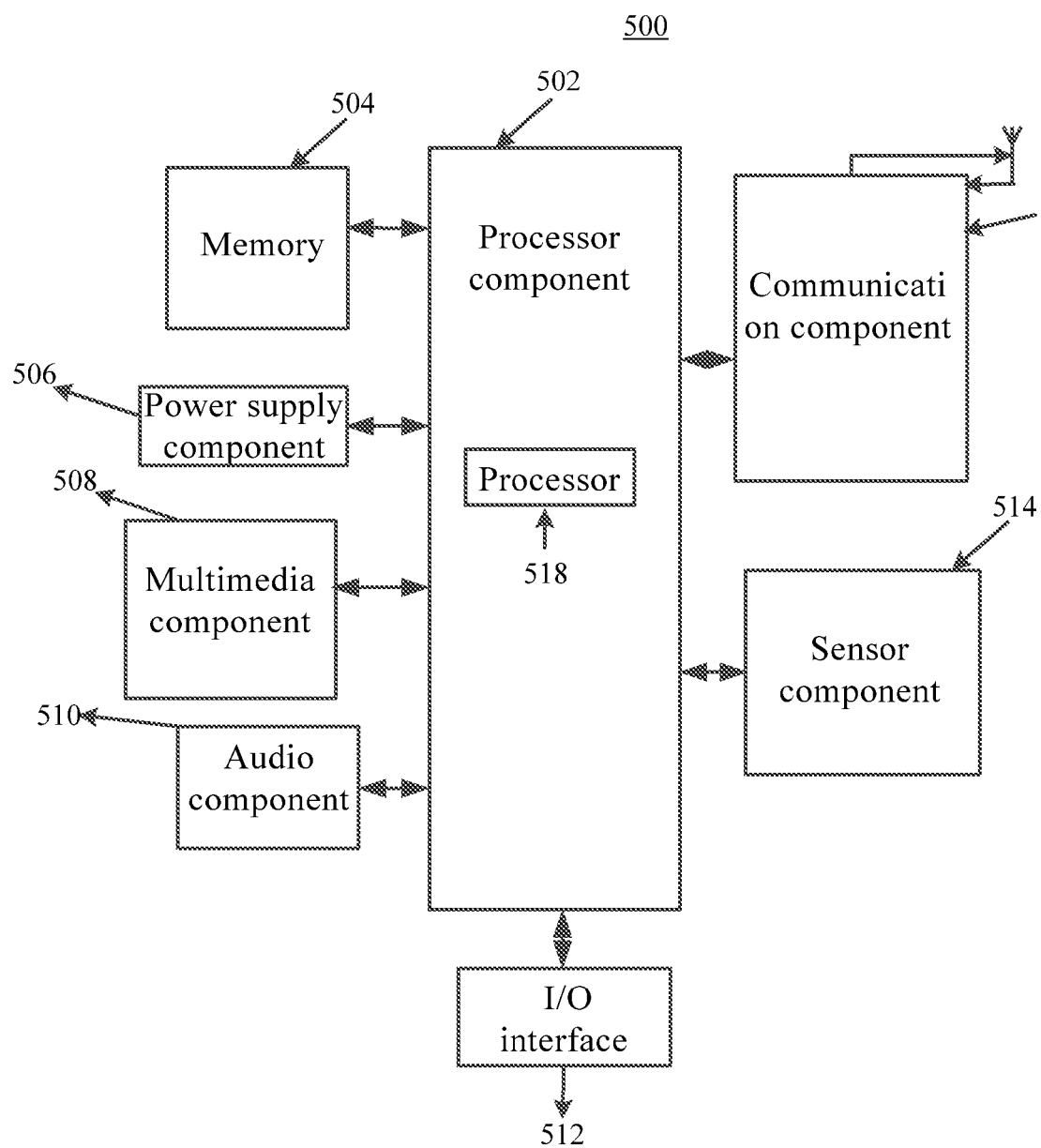
FIG. 5 is a block diagram of an image segmentation device according to an exemplary embodiment.

FIG. 5 is a block diagram of an image segmentation device 500 according to an exemplary embodiment. For example, the device 500 may be a mobile telephone, a computer, a digital broadcasting terminal, a message transceiver device, a games console, a tablet device, a medical device, a fitness facility, a PDA (personal digital assistant) and the like.

Referring to FIG. 5, the device 500 may include one or more components as below: a processor component 502, a memory 504, a power supply component 506, a multimedia component 508, an audio component 510, an input/output (I/O) interface 512, a sensor component 514 and a communication component 516.

The processor component 502 usually controls the overall operation of the device 500, for example, operations related to display, telephone call, data communication, camera operation and recording operation. The processor component 502 may include one or more processors 518 for executing instructions to execute steps of the above methods in part or in whole. In addition, the processor component 502 may include one or more modules suitable for interaction between the processor component 502 and other components. For example, the processor component 502 may include a multimedia component suitable for interaction between the multimedia component 508 and the processor component 502.

The memory 504 is configured to store various types of data so as to support the operation of the device 500. Examples of the data include any application program or instruction executable on the device 500, contact data, phonebook data, message, picture and video, etc. The memory 504 may be implemented by any type of volatile or non-volatile memory device or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 506 provides power for components of the device 500. The power supply component 506 may include a power management system, one or more power supplies, and other components associated with power generation, management and distribution of the device 500.

The multimedia component 508 includes a screen providing an output interface between the device 500 and a user. In some embodiments, the screen may include an LCD (Liquid Crystal Display) and a touch panel (TP). If the screen includes a touch panel, the screen may be implemented as a touch screen for receiving input signal from users. The touch panel includes one or more touch sensors for sensing gestures on the touch panel, for example, touching and sliding, etc. The touch sensor can not only sense the boundary of a touching or sliding operation, but also detect the duration and pressure related to the touching or sliding operation. In some embodiments, the multimedia component 508 includes a front camera and/or a rear camera. When the device 500 is in an operation mode, for example, a photo mode or video mode, the front camera and/or the rear camera can receive external multimedia data. Each front camera and rear camera can be a fixed optical lens system or have optical zooming capacity.

The audio component 510 is configured to output and/or input audio signal. For example, the audio component 510 includes a microphone (MIC). When the device 500 is in an operation mode such as call mode, record mode and speech recognition mode, the microphone is configured to receive external audio signals. The received audio signals may be further stored in the memory 504 or sent out by the communication component 516. In some embodiments, the audio component 510 also includes a loudspeaker for outputting audio signals.

The I/O interface 512 provides interface between the processor component 502 and peripheral interface components. The peripheral interface components may be a keyboard, a click wheel and buttons, etc. These buttons may include home button, volume button, start button and lock button.

The sensor component 514 includes one or more sensors for providing the device 500 with capability of monitoring it status from various aspects. For example, the sensor component 514 may detect the on/off state of the device 500, relative position of components such as the relative position of the display and the small keypad of the device 500. The sensor component 514 may also detect a change in position of the device 500 or its component, the presence or absence of a user touch on the device 500, the orientation or acceleration/deceleration of the device 500, and a change in temperature of the device 500. The sensor component 514 may also include a proximity detector, which is configured to detect the presence of proximate objects in case of no physical touch. The sensor component 514 may also include an optical sensor, for example, CMOS or CCD image sensor for imaging. In some embodiments, the sensor component 514 may also include an acceleration sensor, a gyro sensor, a magnetic sensor, a pressure sensor, or a temperature sensor.

The communication component 516 is used for the wired communication or wireless communication between the device 500 and other devices. The device 500 can access to a wireless network based on certain communication standards, for example, WiFi, 2G or 3G, or combination thereof. In an exemplary embodiment, the communication component 516 receives via a broadcast channel a broadcast signal or broadcast-related information from external broadcast management systems. In an exemplary embodiment, the communication component 516 also includes a near field communication (NFC) component for short-range communication. For example, the NFC component may be implemented by Radio Frequency Identification (RFID) Technology, Infrared Data Association (IrDA) Technology, Ultra-wide Bandwidth (UWB) Technology, Bluetooth (BT) Technology and other technologies.

In exemplary embodiments, the device 500 may be implemented by one or more application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, configured to execute the above methods.

In exemplary embodiments, a non-transitory computer-readable storage medium comprising instructions is also provided, for example, a memory 504 having instructions. The above instructions may be executed by the processors 518 of the device 500 to implement the above methods. For example, the non-temporary computer-readable storage medium may be ROM, random access memory (RAM), CD-ROM, magnetic tape, floppy disk and optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present application as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. An image segmentation method, comprising:
classifying the pixels in the image according to the color values of pixels, wherein pixels with the same color value are classified into a color type;
establishing a saliency model according to the color value of each color type, wherein the saliency model is:

$$S_{i2} = \sum_{j=1, j \neq i}^{N} w(P_j) D_C(P_i, P_j),$$

wherein $w(P_j)$ is the number of pixels in a color type $R_j$, $D_C(P_i, P_j)$ represents a metric value of difference in color between the color type $P_i$ and the color type $P_j$;
obtaining foreground sample points and background sample points of the image according to the saliency model;
establishing a foreground and background classification model according to the saliency model, the foreground sample points and the background sample points; and
segmenting the image according to a predefined graph cut algorithm by using the foreground and background classification model and edge information related to pixels in the image.

2. The method of claim 1, wherein obtaining the foreground sample points and the background sample points of the image according to the saliency model comprises:
calculating saliency values of pixels in the image according to the saliency model;
normalizing the saliency values of pixels;
determining pixels of normalized saliency values greater than a predefined foreground threshold as the foreground sample points; and
determining pixels of normalized saliency values smaller than a predefined background threshold as the background sample points;
wherein the predefined foreground threshold is greater than the predefined background threshold, and the normalized saliency values of pixels are within a range (0, 1).

3. The method of claim 1, wherein the foreground and background classification model comprises a foreground classification model and a background classification model, and establishing the foreground and background classification model comprises:
establishing a foreground color likelihood model according to the foreground sample points;
establishing a background color likelihood model according to the background sample points;
multiplying the saliency model by the foreground color likelihood model to obtain the foreground classification model, and the foreground classification model being configured to characterize a probability of a pixel being the foreground; and
multiplying the saliency model by the background color likelihood model to obtain the background classification model, and the background classification model being configured to characterize a probability of a pixel being the background.

4. The method of claim 3, wherein segmenting the image according to a predefined graph cut algorithm comprises:
calculating a foreground similarity of each pixel in the image by using the foreground classification model;
calculating a background similarity of each pixel in the image by using the background classification model;
obtaining a similarity between each two adjacent pixels in the image;
constructing an undirected graph required for the predefined graph cut algorithm by using the foreground similarity of each pixel, the background similarity of each pixel and the similarity between each two adjacent pixels; and
segmenting the undirected graph by using the predefined graph cut algorithm to segment the image.

5. The method of claim 4, wherein constructing an undirected graph required for the predefined graph cut algorithm comprises:

constructing the undirected graph required for the predefined graph cut algorithm, the undirected graph comprising a foreground vertex, a background vertex, at least one pixel vertex, a first boundary between each two adjacent pixel vertexes, a second boundary between each pixel vertex and the foreground vertex, and a third boundary between each pixel vertex and the background vertex, wherein the pixel vertexes in the undirected graph are corresponding to the pixels in the image;

with regard to each second boundary, determining a foreground similarity of a pixel corresponding to a pixel vertex connected to the second boundary as a weight value of the second boundary;

with regard to each third boundary, determining a background similarity of a pixel corresponding to a pixel vertex connected to the third boundary as a weight value of the third boundary; and with regard to each first boundary, determining a similarity between two pixels corresponding to two pixel vertexes connected to the first boundary as a weight value of the first boundary.

6. The method of claim 1, wherein establishing the saliency model of the image comprises:
over-segmenting the image by using a predefined over-segmentation algorithm to obtain at least one area having pixels of the same color value;
determining a color value and a center of each area; and
establishing the saliency model according to the color values and centers corresponding to the areas.

7. The method of claim 6, wherein the saliency model is:

$$S_{i1} = \sum_{j=1, j \neq i}^{N} w(R_j) D_S(R_i, R_j) D_C(R_i, R_j),$$

wherein $S_{i1}$ is the saliency value of a pixel in an area $R_i$, $w(R_j)$ is the number of pixels in an area $R_j$, $D_s(R_i, R_j)$ represents a metric value of difference in spatial position between the area $R_i$ and the area $R_j$, $D_C(R_i, R_j)$ represents a metric value of difference in color between the area $R_i$ and the area $R_j$, N is the total number of the areas after over-segmentation of the image, $$D_S(R_i, R_j) = \exp(-(\text{Center}(R_i) - \text{Center}(R_j))^2 / \sigma_s^2),$$

Center($R_i$) is the center of the area $R_i$, Center($R_j$) is the center of the area $R_j$, and when all coordinates of pixels in the image are normalized within a range [0, 1], $\sigma_s^2$ 32 0.4.

8. An image segmentation device, comprising:
a processor;
a memory configured to store instructions executable by the processor;
wherein, the processor is configured to perform:
classifying the pixels in the image according to the color values of pixels, wherein pixels with the same color value are classified into a color type;
establishing a saliency model according to the color value of each color type, wherein the saliency model is:

$$S_{i2} = \sum_{j=1, j \neq i}^{N} w(P_j) D_C(P_i, P_j),$$

wherein $w(P_j)$ is the number of pixels in a color type $R_j$, $D_C(P_i, P_j)$ represents a metric value of difference in color between the color type $P_i$ and the color type $P_j$;

obtaining foreground sample points and background sample points of the image according to the saliency model;

establishing a foreground and background classification model according to the saliency model, the foreground sample points and the background sample points; and segmenting the image according to a predefined graph cut algorithm by using the foreground and background classification model and edge information related to pixels in the image.

9. The device of claim 8, wherein obtaining the foreground sample points and the background sample points of the image according to the saliency model comprises:
calculating saliency values of pixels in the image according to the saliency model;
normalizing the saliency values of pixels; determining pixels of normalized saliency values greater than a predefined foreground threshold as the foreground sample points; and
determining pixels of normalized saliency values smaller than a predefined background threshold as the background sample points;
wherein the predefined foreground threshold is greater than the predefined background threshold, and the normalized saliency values of pixels are within a range (0, 1).

10. The device of claim 8, wherein the foreground and background classification model comprises a foreground classification model and a background classification model, and establishing the foreground and background classification model comprises:
establishing a foreground color likelihood model according to the foreground sample points;
establishing a background color likelihood model according to the background sample points;
multiplying the saliency model by the foreground color likelihood model to obtain the foreground classification model, and the foreground classification model being configured to characterize a probability of a pixel being the foreground; and
multiplying the saliency model by the background color likelihood model to obtain the background classification model, and the background classification model being configured to characterize a probability of a pixel being the background.

11. The device of claim 10, wherein segmenting the image according to a predefined graph cut algorithm comprises:
calculating a foreground similarity of each pixel in the image by using the foreground classification model;
calculating a background similarity of each pixel in the image by using the background classification model;
obtaining a similarity between each two adjacent pixels in the image;
constructing an undirected graph required for the predefined graph cut algorithm by using the foreground similarity of each pixel, the background similarity of each pixel and the similarity between each two adjacent pixels; and
segmenting the undirected graph by using the predefined graph cut algorithm to segment the image.

12. The device of claim 11, wherein constructing an undirected graph required for the predefined graph cut algorithm by using the foreground similarity of each pixel comprises:
constructing the undirected graph required for the predefined graph cut algorithm, the undirected graph comprising a foreground vertex, a background vertex, at least one pixel vertex, a first boundary between each two adjacent pixel vertexes, a second boundary between each pixel vertex and the foreground vertex, and a third boundary between each pixel vertex and the background vertex, wherein the pixel vertexes in the undirected graph are corresponding to the pixels in the image;
with regard to each second boundary, determining a foreground similarity of a pixel corresponding to a pixel vertex connected to the second boundary as a weight value of the second boundary;
with regard to each third boundary, determining a background similarity of a pixel corresponding to a pixel vertex connected to the third boundary as a weight value of the third boundary; and
with regard to each first boundary, determining a similarity between two pixels corresponding to two pixel vertexes connected to the first boundary as a weight value of the first boundary.

13. The device of claim 8, wherein establishing the saliency model of the image comprises:
over-segmenting the image by using a predefined over-segmentation algorithm to obtain at least one area having pixels of the same color value;
determining a color value and a center of each area; and
establishing the saliency model according to the color values and centers corresponding to the areas.

14. The device of claim 13, wherein the saliency model is:

$$S_{i1} = \sum_{j=1, j \neq i}^{N} w(R_j) D_S(R_i, R_j) D_C(R_i, R_j),$$

wherein $S_{i1}$ is the saliency value of a pixel in an area $R_i$, $w(R_j)$ is the number of pixels in an area $R_j$, $D_S(R_i, R_j)$ represents a metric value of difference in spatial position between the area $R_i$ and the area $R_j$, $D_C(R_i, R_j)$ represents a metric value of difference in color between the area $R_i$, and the area $R_j$, N is the total number of the areas after over-segmentation of the image, $D_S(R_i, R_j) = \exp(-(\text{Center}(R_i) - \text{Center}(R_j))^2 / \sigma_s^2$, Center($R_i$) is the center of the area $R_i$, Center($R_j$) is the center of the area $R_j$, and when all coordinates of pixels in the image are normalized within a range [0, 1], $\sigma_s^2$ 32 0.4.

15. A non-transitory computer-readable storage medium having stored therein instructions, when executed by one or more processors of a mobile device, causes the mobile device to perform an image segmentation method, comprising:
classifying the pixels in the image according to the color values of pixels, wherein pixels with the same color value are classified into a color type;
establishing a saliency model according to the color value of each color type, wherein the saliency model is:

$$S_{i2} = \sum_{j=1, j \neq i}^{N} w(P_j) D_C(P_i, P_j),$$

wherein $w(P_j)$ is the number of pixels in a color type $R_j$, $D_C(P_i, P_j)$ represents a metric value of difference in color between the color type $P_i$ and the color type $P_j$;
obtaining foreground sample points and background sample points of the image according to the saliency model;
establishing a foreground and background classification model according to the saliency model, the foreground sample points and the background sample points; and
segmenting the image according to a predefined graph cut algorithm by using the foreground and background classification model and edge information related to pixels in the image.

16. The medium of claim 15, wherein obtaining the foreground sample points and the background sample points of the image according to the saliency model comprises:
calculating saliency values of pixels in the image according to the saliency model;
normalizing the saliency values of pixels;
determining pixels of normalized saliency values greater than a predefined foreground threshold as the foreground sample points; and
determining pixels of normalized saliency values smaller than a predefined background threshold as the background sample points;
wherein the predefined foreground threshold is greater than the predefined background threshold, and the normalized saliency values of pixels are within a range (0, 1).

* * * * *